(No Model.)

J. L. MOORE.
HANDLE FOR HARDWARE, &c.

No. 555,872.　　　　　　　　　Patented Mar. 3, 1896.

Witnesses:
J. W. Gayfield
H. I. Clemons

Inventor
James L. Moore,
by Chapin
Attorneys

UNITED STATES PATENT OFFICE.

JAMES L. MOORE, OF STRATFORD, CONNECTICUT, ASSIGNOR TO WILLIAM A. WHITNEY, FRED R. BROWN, AND THE HENDEE & NELSON MANUFACTURING COMPANY, OF SPRINGFIELD, MASSACHUSETTS.

HANDLE FOR HARDWARE, &c.

SPECIFICATION forming part of Letters Patent No. 555,872, dated March 3, 1896.

Application filed January 2, 1896. Serial No. 574,110. (No model.)

*To all whom it may concern:*

Be it known that I, JAMES L. MOORE, a citizen of the United States, residing at Stratford, in the county of Fairfield and State of Connecticut, have invented new and useful Improvements in Handles for Hardware and Analogous Purposes, of which the following is a specification.

This invention relates to handles for various articles of hardware and culinary utensils and for other purposes, the object being to provide a ventilated handle of improved construction which is contractible and expansible in a direction at right angles to the axis thereof, which when applied to an object which becomes heated in use remains cooler than said object, so that the bare hand may be applied thereto; and the invention consists in the peculiar construction and arrangement of the several parts of the handle, and in means for attaching the same to an object, all as hereinafter fully described and more particularly pointed out in the claims.

Figure 1:
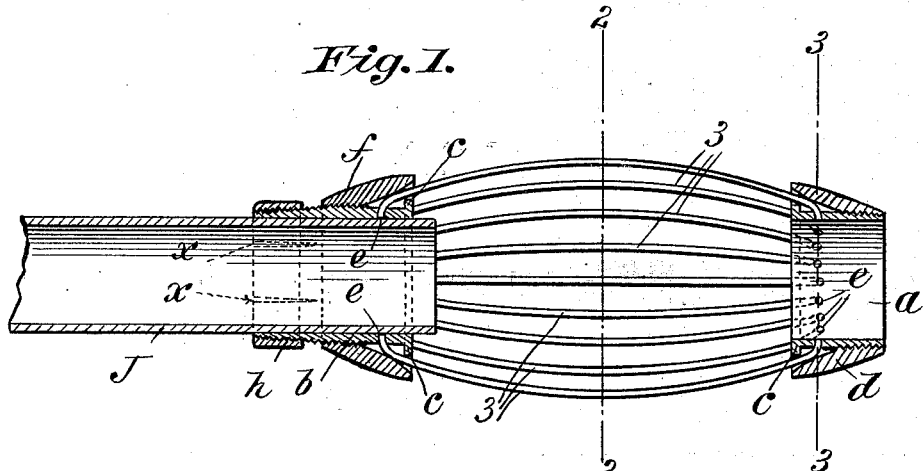
Figure 4:
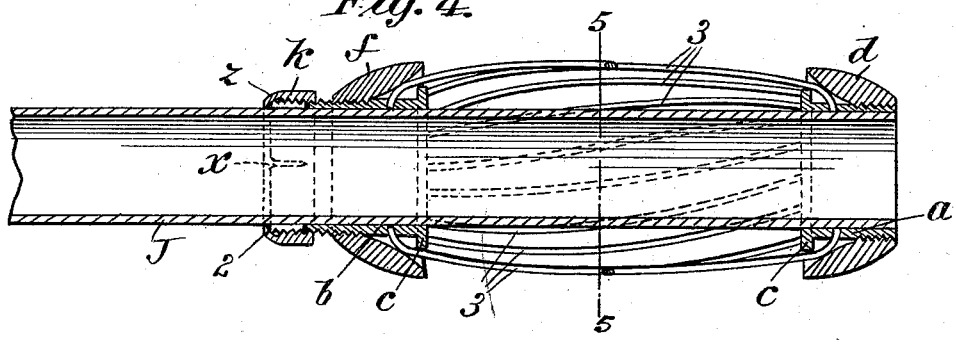
Figure 2:
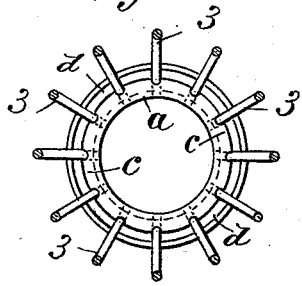
Figure 5:
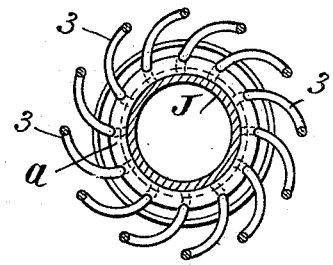
Figure 3:
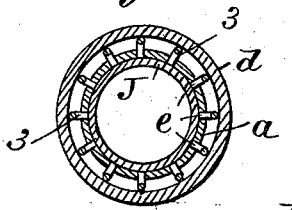

In the drawings forming part of this specification, Figure 1 is a longitudinal section of a handle constructed according to my invention, this figure illustrating a like sectional view of a tubular part of an object to which the handle may be applied. Fig. 2 is a sectional view on line 2 2, Fig. 1. Fig. 3 is a section on line 3 3, Fig. 1. Fig. 4 is a view similar to Fig. 1, but showing a slightly-modified construction, as hereinafter described. Fig. 5 is a sectional view on line 5 5, Fig. 4.

In the drawings, $a$ and $b$ are ferrules, one at each end of the handle, $a$ being at the free or outer end thereof, and $b$ at the opposite or inner end. Said ferrule $a$ has its outer end portion externally screw-threaded, as shown, and has an annular collar $c$ around its inner end. Said ferrule $a$ has a series of perforations $e$ through its body, as shown, arranged preferably in a circle around the same. A nut $d$, preferably externally tapered and of such length as to extend over and inclose said collar $c$, is screwed onto said ferrule $a$. The end of said nut $d$ inclosing said collar $c$ is of an internal diameter greater than the diameter of said collar, for a purpose hereinafter described. The said ferrule $b$ is substantially identical in construction with said ferrule $a$, excepting that its screw-threaded end is somewhat longer, and is preferably made slightly tapering, as shown in Fig. 1, or, if preferred, the extremity thereof may be slightly beveled, as shown at 2, Fig. 4, said tapering or beveled form being provided for a purpose below described. A nut $f$ is also provided for said ferrule $b$, of the same construction as said nut $d$, and serving the same purpose as the latter. The said ventilated and contractible and expansible portion of the handle which is located between said end ferrules $a$ and $b$ consists of a series of metallic wires or bars 3, which may be either round or flat. The said wires 3 are preferably run in lines substantially parallel with the axis of the handle, as shown in Fig. 1, but, if preferred, they may extend spirally, as shown in Fig. 4. In case said wires 3 be spirally arranged the handle is placed so far onto the object J, to which it may be applied, that both of the end ferrules $a$ and $b$ may be tightly fitted and secured on said object J. The ends of said bars or wires extend between said collars $c$ of said ferrules, and the ends of said nuts $d$ and $f$ entering the perforations $e$ of each ferrule, as shown, and are arranged side by side, and having their extremities more or less converging around a circle, to the end that the group of wires may assume a cylindrical form and have the greatest diameter midway between the ends thereof. The ends of said wires having been entered into said perforations, as described, the nuts $d$ and $f$ are then screwed against said wires, thereby rigidly clamping them between said nuts and collars and firmly uniting the parts. Said bars are preferably curved outwardly, as shown.

If desired, the ends of the wires 3 may be brazed or soldered to said ferrules, thereby additionally securing the ferrules to the wires, and vice versa. The said wires 3 are of suitable spring quality, such as piano or similar wire, or of hard-drawn brass spring-wire.

The aforesaid screw-threaded extension of the ferrule $b$ provides for the application thereto of a nut $h$, whereby the end of the ferrule therein is clamped tightly against the object J within said ferrule, and the handle is thereby secured on said object. If desired, the end of the ferrule $b$, on which said nut $h$ is screwed, may be split, as indicated by dotted lines at $x$, Figs. 1 and 4, and instead of clamping the extremity of the ferrule $b$ onto the object J by means of the nuts $h$ or $k$, as described, said ferrule may be secured thereto by screws or rivets passing through the shank portion of said ferrule beyond the nut $f$ and into said object J.

Fig. 4 illustrates a nut $k$, which may be used in place of the nut $h$, Fig. 1. Said nut $k$ has its outer border inwardly beveled at $z$ for engagement against the said slightly-beveled end of the ferrule $b$ of Fig. 4, whereby the deflection of the extremity of said last-named ferrule against the object J, by turning the nut $k$, is facilitated.

Having thus described my invention, what I claim, and desire to secure by Letters Patent, is—

1. A handle for hardware and analogous articles consisting of a series of metallic bars arranged side by side, the two opposite extremities of which bars each converge around a circle, combined with a ferrule inclosed by each of said extremities, and means for clamping the extremities of said bars to said ferrules, substantially as set forth.

2. A handle for hardware and analogous articles consisting of a series of metallic bars arranged side by side, the two opposite extremities of which bars each converge around a circle, combined with a ferrule inclosed by each of said extremities of said bars, and a nut screwing onto each ferrule which incloses the said extremities of said bars and clamps the same to the ferrule, substantially as set forth.

3. A handle for hardware and analogous articles consisting of a series of outwardly-curved metallic bars arranged side by side in separated relations each to the other, and whose opposite extremities converge around a circle, combined with a ferrule inclosed by each of said extremities having an annular collar thereon over which said extremities pass, and perforations into which said extremities enter, and a nut screwing onto said ferrule between which and said collar the said extremities are clamped, substantially as set forth.

4. A handle for hardware and analogous articles consisting of a series of metallic bars arranged side by side in separated relations each to the other, and whose opposite extremities converge around a circle, combined with a ferrule inclosed by each of said extremities, a nut screwing onto each of said ferrules which incloses the said extremities and clamps the same to said ferrules, and means for securing one of said ferrules to an object to which said handle is to be attached, substantially as set forth.

5. A handle for hardware and analogous articles consisting of a series of metallic bars arranged side by side in separated relations each to the other, and whose opposite extremities converge around a circle, combined with a ferrule inclosed by each of said extremities, a nut screwing onto each of said ferrules which incloses the said extremities and clamps the same to said ferrules, a screw-threaded tubular extension on one of said ferrules, and a nut screwing onto said extension and operating to compress the said extension against an object within the ferrule, substantially as set forth.

JAMES L. MOORE.

Witnesses:
K. I. CLEMONS,
WM. H. CHAPIN.